United States Patent [19]

Biehl

[11] 4,000,580
[45] Jan. 4, 1977

[54] SEED GERMINATOR

[76] Inventor: Roy A. Biehl, 2934 N. Murray St., Milwaukee, Wis. 53211

[22] Filed: Oct. 24, 1975

[21] Appl. No.: 625,493

[52] U.S. Cl. .................................. 47/14; 47/79; 206/45.34; 206/471; 47/84
[51] Int. Cl.[2] .................. A01C 1/02; A01G 9/02; B65D 25/54; B65D 73/00
[58] Field of Search .......... 47/38, 38.1, 14, 34.11, 47/37, 56, 37.3, 34 R; 206/461, 469, 471, 45.34

[56] References Cited

UNITED STATES PATENTS

| 2,879,627 | 3/1959 | Hollander | 47/1.2 |
|---|---|---|---|
| 2,993,300 | 7/1961 | Sawyer | 47/1.2 |
| 3,082,575 | 3/1963 | Schulz | 47/37 |
| 3,125,830 | 3/1964 | Knutsson | 47/14 X |
| 3,177,616 | 4/1965 | Sawyer | 47/38.1 X |
| 3,241,264 | 3/1966 | Porter et al. | 47/38.1 |
| 3,362,106 | 1/1968 | Goldring | 47/38 X |
| 3,748,098 | 7/1973 | Dutch | 206/471 X |
| 3,872,621 | 3/1975 | Greenbaum | 47/56 X |
| 3,913,734 | 10/1975 | Siegel | 206/469 X |

FOREIGN PATENTS OR APPLICATIONS 2,017,100   4/1970   Germany ................ 47/38

Primary Examiner—Edgar S. Burr
Assistant Examiner—Steven A. Bratlie
Attorney, Agent, or Firm—Quarles & Brady

[57] ABSTRACT

An inexpensive, disposable seed germinator especially adapted for viewing seed growth comprises a unitary body formed by sealing two sheets of plastic material, at least one of which is transparent, to form an enlarged germination chamber, a relatively thin plant nutrient chamber, a water reservoir chamber and channels connecting the water reservoir to the nutrient chamber and the germination chamber. The germinator may be supplied with or without seeds and/or plant nutrients depending upon its intended use.

8 Claims, 4 Drawing Figures

SEED GERMINATOR

BACKGROUND OF THE INVENTION

There is a continuing need in schools for simple, inexpensive devices which can be used to illustrate scientific phenomena. Among the area in which such devices are especially needed is the science of botany. At the present time there is no simple, inexpensive device which can be given to individual students so that they can actually see a seed germinate and subsequently take root and develop foliage. In many classrooms, the only device available to demonstrate plant growth is a single, large botanical growth chamber which is comprised of two side walls and a front and back wall consisting of large plates of glass which are spaced relatively closely together. In appearance the botanical growth chamber resembles somewhat the well-known ant farm. Botanical growth chambers are large and cumbersome and considered too expensive to be trusted to the students. As a result, the student does not participate in the learning process as effectively as he could if there were available a relatively inexpensive germinator which he could personally use to observe seeds germinating and developing roots and foliage or which he could use to perform simple botanical experiments.

SUMMARY OF THE INVENTION

It is the general object of this invention to provide a relatively simple, inexpensive, disposable seed germinator which can be used easily and safely by elementary school students and which makes it possible for the students to actually observe a seed germinating, taking root, and developing foliage. Another object is to provide a germinator which is made, at least in part, of a clear, transparent material, and which may be supplied to the student complete with nutrient and seed. Still another object is to disclose an inexpensive germinator with a controlled environment which can be used by an advanced student to perform experiments and research on the effects of minerals, acid and alkaline soils, light, heat, chemicals, insecticides and the like on seeds and developing plants. Still another object is to provide a germinator with a controlled environment which permits seed growth to be viewed microscopically without removing the seed from the controlled environment. A more limited object is to provide the particular structures hereafter claimed.

The foregoing and other objects and advantages will appear from the following description. In the description reference is made to the accompanying drawings which form a part thereof, in which there is shown by way of illustration and not of limitation preferred embodiments of the invention.

DESCRIPTION OF THE PREFERRED EMBODIMENTS

Figure 1:
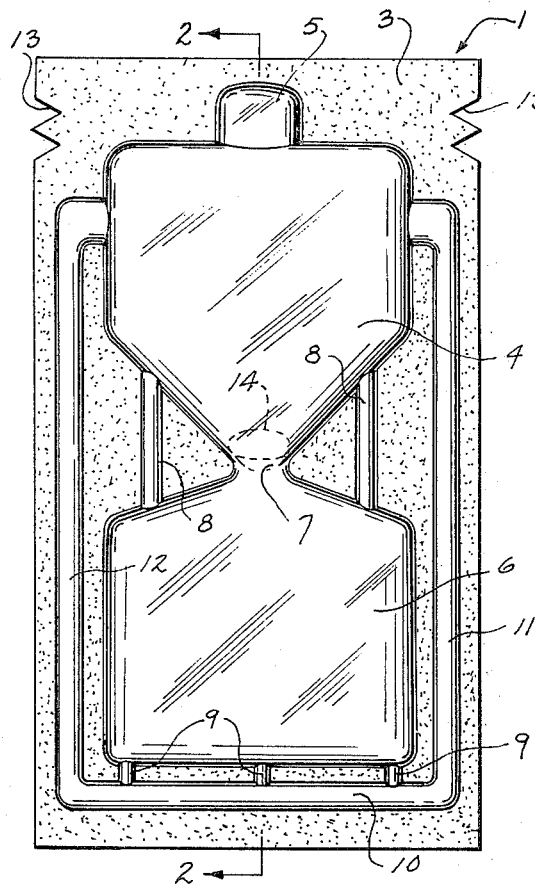
FIG. 1 is a perspective view of one embodiment of the invention.
Figure 2:
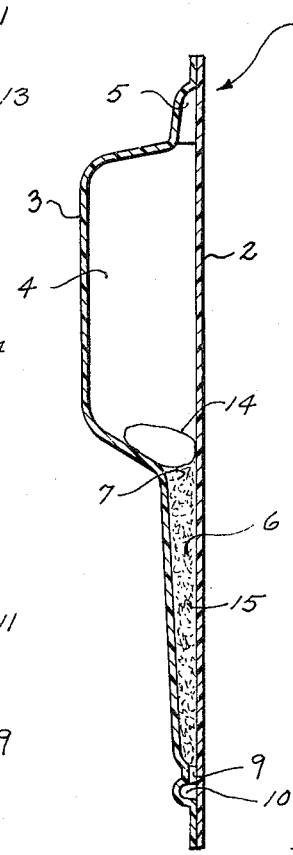
FIG. 2 is a cross-sectional view on the vertical plane taken along lines 1—1 of FIG. 1.

The embodiment of the germinator shown in FIGS. 1 and 2 is especially adapted for use by the individual student.

In the drawing, the seed germinator is designated generally by the reference numeral 1 and is preferably formed of a transparent semi-rigid plastic material.

As seen in FIG. 1, the germinator 1 is of a generally rectangular shape and consists of two sheets of plastic material sealed about their edges to form a unitary body having a flat back wall 2 and a front wall 3 provided with a relatively large germination chamber 4 with a central entrance port 5 at the top, a relatively thin nutrient chamber 6, a throat-like passageway 7, and a pair of channels 8 connecting the nutrient chamber 6 to the germination chamber 4. At the bottom of the plant nutrient chamber, channels 9 are provided which lead to a water reservoir chamber 10 which is provided with water recycling channels 11 and 12 which communicate with the germination chamber. As seen in FIG. 1 notches 13 are provided on each side of the upper portion of the germinator to indicate the cut line which will expose the port 5. In FIGS. 1 and 2 a seed 14 is seen positioned in the germination chamber and plant nutrient 15 is present in the nutrient chamber.

In the illustrated embodiment, the germination chamber is roughly in the form of a pentagon with the point of the pentagon forming the throat 7 which connects the germination chamber 4 to the nutrient chamber 6. The germination chamber 4 is sufficiently large to permit the seed 14 to expand when it absorbs water and begins to grow and for the first leaves which appear and the outer shell to be cast off. In addition, there is sufficient room in the chamber for the initial foliage of the new plant to expand and freely develop. The throat 7 is preferably sized to allow water and/or nutrient to freely flow between the germination chamber 4 and the nutrient chamber 6, but is not large enough to allow the seed 14 to enter the nutrient chamber. It is preferred that the seed be retained in the germination chamber so that it does not become buried in the nutrient during shipping as that might prevent the ready viewing of the germination process. Any nutrient which enters the germination chamber during the shipping process can be retransferred to the nutrient chamber merely by placing the germinator in an upright position and tapping it gently until the nutrient flows out of the germination chamber.

As seen best in FIG. 2 the bottom most front portion of the germination chamber 4 is preferably angled downwardly toward the flat back wall of the germinator. This allows the seed to rest at an angle down and toward the back side of the chamber as shown in FIG. 2. When the seed is thus positioned by gravity against the back wall it can be readily viewed through the flat back wall surface even microscopically. In addition, when the seed is thus positioned the primary spout of the seed as it forms is directed downward toward the nutrient chamber 6 and against the back wall of the nutrient chamber. As a result, the roots form in such a manner that they are positioned against the wall of the nutrient chamber and therefore can be readily seen.

To conduct an experiment using the described germinator, the device is placed on end and tapped so that any nutrient that may have entered the germination chamber will flow back into the nutrient chamber and not interfere with the viewing of the seed. The port 5 in the top of the germination chamber is then opened by cutting along the cut line indicated by the notches 13. Water is then introduced into the germination chamber through the central port 5 by means of a small cup, funnel, or eye dropper. Upon entering the germination chamber the water will first fill that chamber, the channels 8 and the throat 7 and then by capillary action be absorbed into the soil or nutrient in the nutrient chamber; when the nutrient has absorbed its limit the excess water seeps out of the drip channels 9 located in the bottom of said chamber, filling the water reservoir chamber 10 and then rising upward in the water recycling channels 11 and 12. The water level in the reservoir chamber and the recycling channels indicates the height of the water level in the soil and thus provides a visual indication of when rewatering should take place. The water recycling channels 11 and 12 can also be used as a gauge to indicate how much water is used in the development of the plant within a particular period of time and to remove excess water from the nutrient chamber 6 if the student has inadvertantly added too much water. Once the soil or plant nutrient 12 is saturated with water, enough extra water should be added to fill the bottom of the germination chamber and if a seed is not present a seed should then be introduced into the chamber. The germinator will usually be supplied with two to four seeds in the germination center to eliminate the possibility that the germinator will be distributed with only one seed which for some reason may not germinate due to a defect in the seed. The central port 5 at the top of the germination chamber 4 can then be closed by clamping the front and rear faces of the port together or by coating the inner surfaces of the faces of said port with a resealable adhesive and then pressing the two surfaces together.

To initiate the germination process, the germinator is laid in a horizontal position with the flat back side up and placed in a dark, warm location for 24 to 48 hours; it is placed in the horizontal position to keep the seed wet and in the best condition for germination. After the seed has germinated, all but one of the seeds can be removed and those that have been removed can be examined separately and dissected if desired. The container is then preferably placed in a substantially vertical position with the top port open. The germinator can be placed in a stand or leaned against the glass tumbler or the like to keep it in the desired position. Preferably, the container is placed in indirect light with its flat wall surface faced at an angle down and away from the light source at approximately 80°. This allows the dirt to cover the developing root structure and protect it from light thereby duplicating the ground environment. It also allows the root system to develop against the wall of the nutrient chamber because the roots will grow in a downward direction.

The described germinator is compact and especially adapted to be picked up at any time and viewed from either the front or the rear. The flat rear wall 2 makes it especially easy to view the germinator under a microscope.

Figure 4:
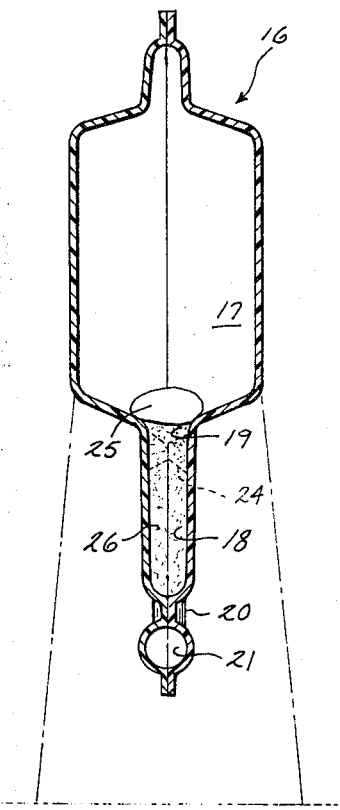
FIG. 4 is a cross-sectional view taken along lines 3—3 of FIG. 3.
Figure 3:
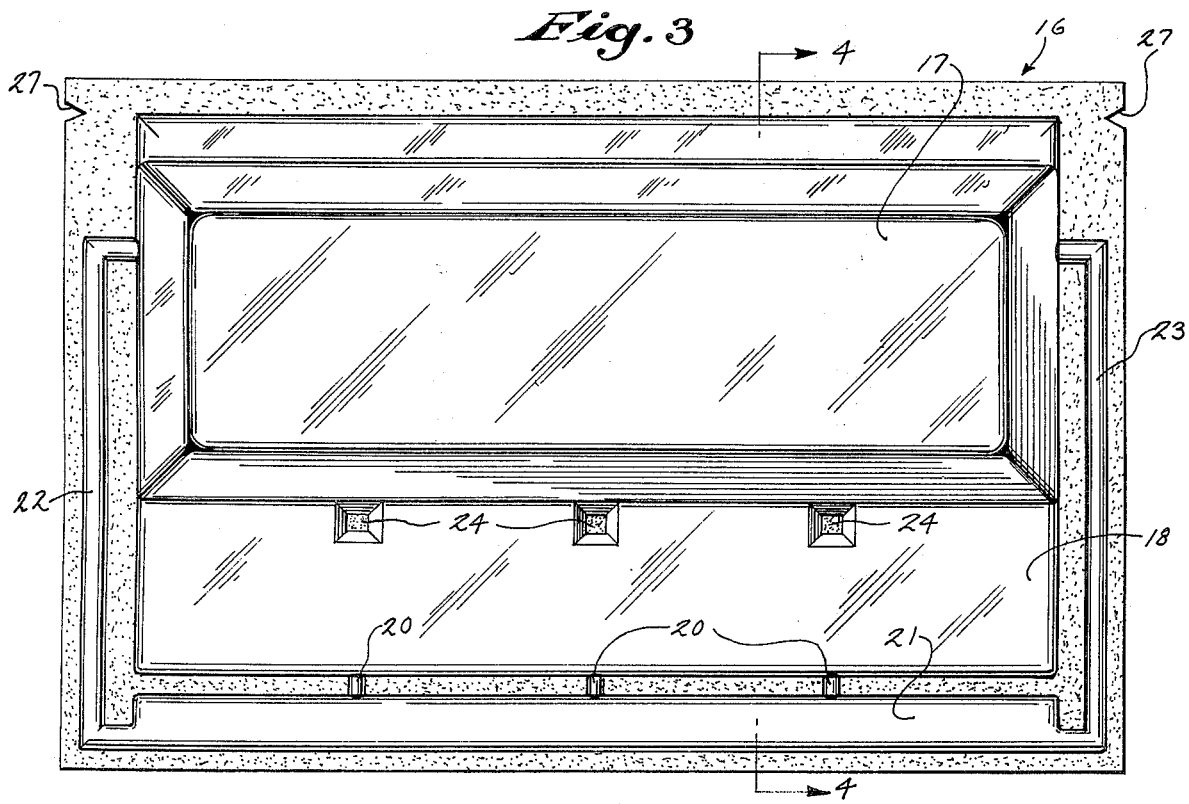
FIG. 3 is a perspective view of a larger embodiment of the invention.

In FIGS. 3 and 4 of the drawing, a slightly different, larger embodiment of the germinator is illustrated which is useful for the germination and growing of a plurality of plants which are intended to be transplanted to a garden such as, for example, tomato plants.

The germinator shown in FIGS. 3 and 4 consists of two sheets of formed plastic sealed along their edges to form a unitary body 16 comprising an enlarged germination chamber 17, a relatively narrow plant nutrient chamber 18, a throat-like passageway 19 (seen in FIG. 4) connecting the nutrient chamber 18 and the germination chamber 17; channels 20 connecting the nutrient chamber 18 to a water reservoir chamber 21 and water recycling channels 22 and 23 which connect the water reservoir to the germination chamber. To prevent the plant nutrient chamber from being distorted, the faces of the two sheets forming the germinator are spot sealed 24.

The embodiment of FIGS. 3 and 4 is generally supplied with the nutrient in the nutrient chamber and seeds 25 positioned on the top of the nutrient 26. The seeds may be supplied in the form of a seed tape, if desired. In order to initiate the growing process, the top of the germination chamber is opened by cutting along the cut line indicated by the notches 27. Water is then added until the water seeps through the nutrient and appears in the water reservoir 21 and the water recycling channels 22 and 23. The device is then placed in a stand (seen only in broken lines in FIG. 4) in direct or indirect sunlight. When the seeds have germinated and foliage has developed the germinator is removed from the stand and the flexible transparent body can then be cut with a pair of scissors to expose a desired plant and that plant replanted into a pot or garden.

The germinators shown in the two described embodiments are preferably made from a thermoplastic material such as styrene polymers and copolymers of styrene, acrylics, polyethylene, vinyls, and cellulose derivatives such as cellulose acetate, cellulose propionate, and cellulose acetate butyrate. Preferably the material is one which may be readily recycled. Especially preferred for use is cellulose acetate butyrate in the form of 5 mil sheets. The 5 mil sheet is preferred because it results in the formation of a germinator which has a germinating chamber which is sufficiently rigid to prevent the accidental destruction or injury of the germinating seed or the foliage of the embryonic plant. The germination, plant nutrient, and water reservoir chambers as well as the various channels are formed in sheets of thermoplastic material by conventional thermoforming techniques in which the thermoplastic sheet is heated to its softening temperature and forced against the contours of a mold by mechanical, air or vacuum pressure. The plastic when it is allowed to cool retains the mold shape in detail. The two sheets making up the front and back of the containers may be attached or sealed by adhesives or the like or heat sealed to form the unitary body. In the germinator shown in FIGS. 1 and 2 only one of the sheets has the chambers and channels formed in it and the second sheet is the flat back wall 2. In the embodiment of the germinator shown in FIGS. 3 and 4 both sheets are formed with the chambers and the channels and then heat sealed to form the unitary body.

In the preferred practice the nutrient is introduced into the germination chamber cavity in one of the sheets prior to sealing the sheets about their edges. The second sheet is then sealed to the first sheet about the sides and bottom edges. The thus sealed container is then placed in the vertical position with the top still open and tapped against a hard surface to let the soil and/or nutrient flow into the nutrient chamber. At this time a seed, if one is intended to be included, is placed in the germination chamber and the unit is sealed across the top to form a completely sealed container ready for packaging and shipping.

While for purpose of illustration the germinator has been described as being of essentially one-piece construction, it is obvious that it could be made in several pieces suitably attached in ways known to the art. In addition, other materials and methods of construction can be substituted for those described. While it is preferred that the complete germinator be made of transparent, semi-rigid material it would not be a departure from the spirit of the invention if the germinator was made with only one transparent wall or only one transparent wall section. In addition, as previously described, the germinator may be furnished with or without seed or nutrient, or even unsealed. What has been disclosed is a germinator particularly adapted for use by the beginning student and the advanced student as well as the home gardener.

It will be apparent to those skilled in the art that other variations and changes may be made without departing from the spirit and scope of the invention which is intended to be limited only by the claims which follow.

I claim:

1. A seed germinator for observing the germination of a seed and performing botanical experiments comprises a unitary closed body formed by sealing a flat back sheet and a thermo-formed front sheet about their top, bottom and side edges, said body having a germination chamber, a nutrient chamber positioned below the germination chamber and connected thereto by a narrow throat, a closed water reservoir located adjacent said nutrient chamber, at least one channel connecting the nutrient chamber to the water reservoir, and at least one recycling channel connecting the water reservoir to the germination chamber so that excess water can be returned to the germination chamber.

2. The seed germinator of claim 1 in which the germination chamber is provided with a top port which is initially closed and the side edges of said body are provided with indicia which indicate where the body is to be cut to open the port to the outside without directly opening the nutrient chamber and water reservoir so that the germinator may be placed on its side or at an angle without the nutrient and water leaving the body.

3. The seed germinator of claim 2 in which the germination chamber contains at least one seed and the nutrient chamber contains a soil-containing nutrient.

4. A seed germinator for visually observing the germination of a seed and for performing botanical experiments which comprises a unitary closed body formed by sealing two sheets of thermoplastic material at least one of which is transparent about their top, bottom and side edges, said body having three separate and distinct chambers including a germination chamber, a nutrient chamber positioned below the germination chamber and a water reservoir chamber positioned adjacent said nutrient chamber, said germination chamber and nutrient chamber being connected by a narrow throat, the body being further provided with at least one channel connecting the water reservoir chamber to the nutrient chamber and at least one water recycling channel connecting the water reservoir chamber to the germination chamber.

5. The seed germinator of claim 4 in which the germination chamber is provided with a top port and the side edges of the body are provided with indicia which indicate where the body should be cut to expose the top port and provide access to the germination chamber.

6. A seed germinator for visually observing the germination of a seed and performing botanical experiments which comprises a unitary closed body formed by sealing two sheets of thermoplastic material, at least one of which is transparent, about their top, bottom and side edges to form a body having a germination chamber containing at least one seed, said germination chamber having a top port adapted to be opened, a nutrient chamber containing a soil-containing nutrient positioned below the germination chamber and connected thereto by a narrow throat and a water reservoir located adjacent said nutrient chamber, said water reservoir being connected to the nutrient chamber by at least one connecting channel, said water reservoir being further connected to the germination chamber by at least one elongated recycling channel which extends along the side of the body so that if during the use of the germinator excess water is present it may be expressed from the nutrient in the nutrient chamber via the connecting channel, into the water reservoir and from there transferred to the germination chamber via the recycling channel.

7. The seed germinator of claim 6 in which indicia are provided adjacent the side edges of the body to indicate where the top of the body should be cut to expose the top port of the germination chamber.

8. The seed germinator of claim 6 in which one sheet is flat and transparent so that the growth of the seed foliage and the root structure can be observed therethrough without disturbing the growth of a seed in the germinator.

* * * * *